June 25, 1940.  L. C. MEYERS ET AL  2,205,989
COMBINED CLUTCH AND BRAKE MECHANISM
Filed May 4, 1939  2 Sheets-Sheet 2
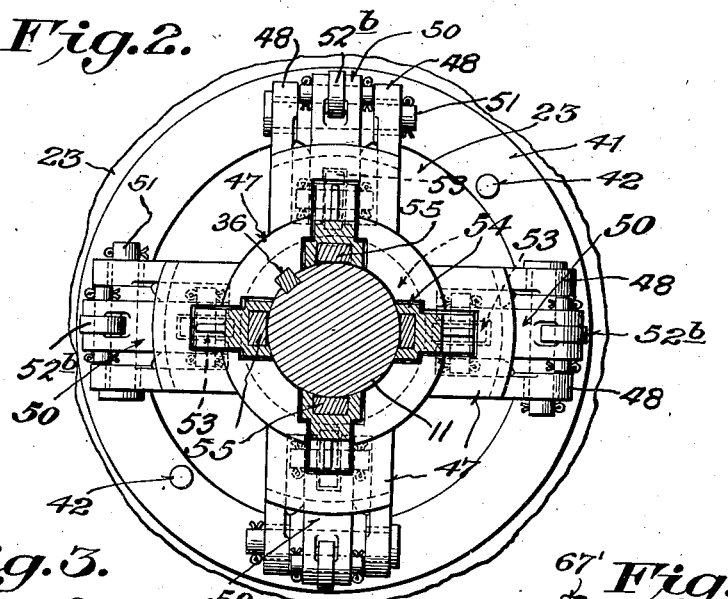
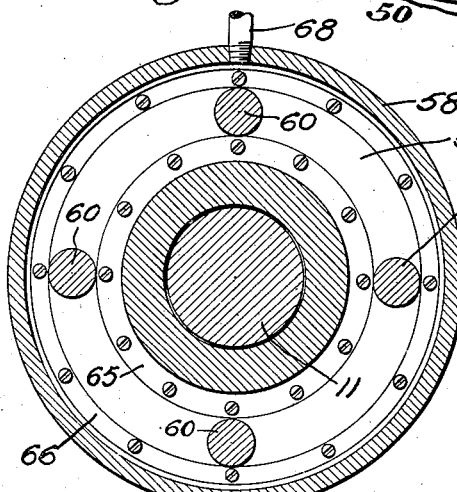
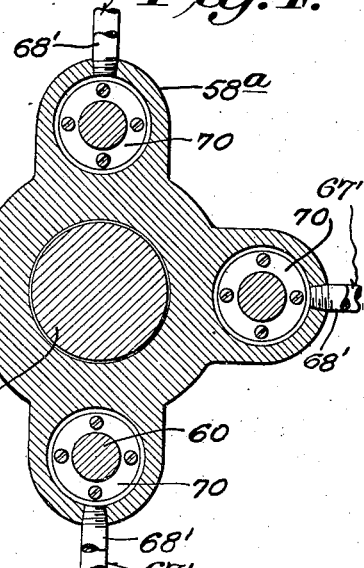
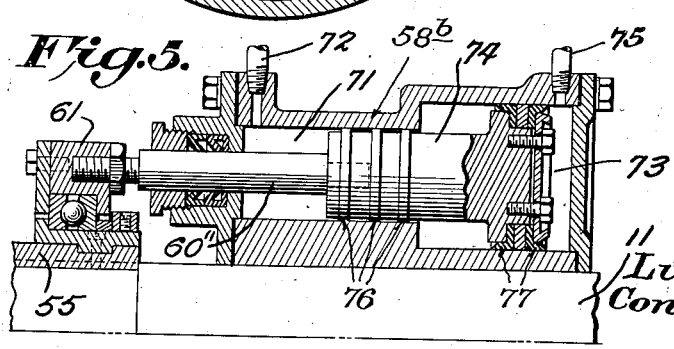
Inventors
Luther C. Meyers,
Conrad O. Hersam,
Attorney Patented June 25, 1940

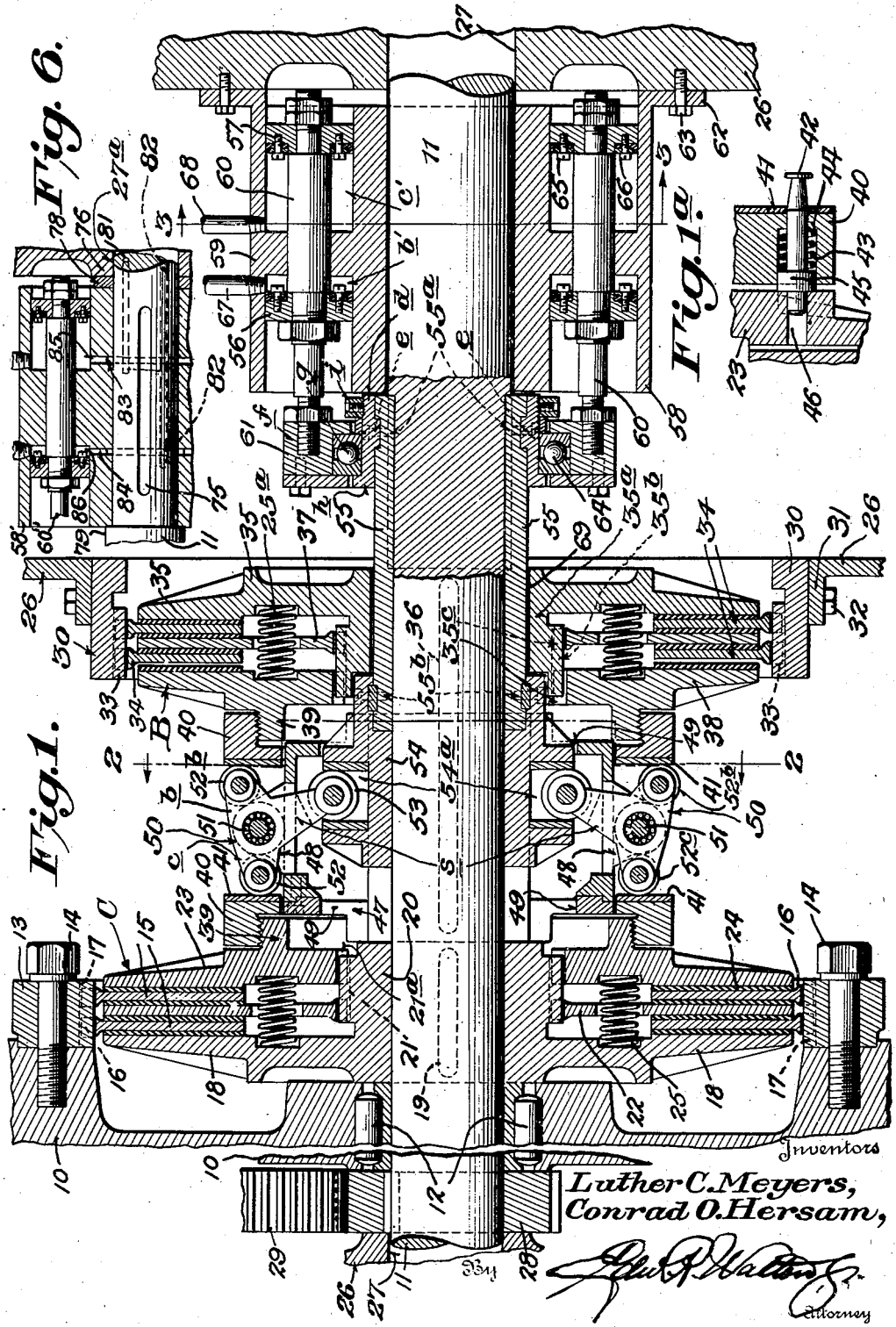

2,205,989

UNITED STATES PATENT OFFICE 2,205,989

COMBINED CLUTCH AND BRAKE MECHANISM

Luther C. Meyers, Bridgeton, N. J., and Conrad O. Hersam, Germantown, Philadelphia, Pa., assignors to Ferracute Machine Company, Bridgeton, N. J., a corporation of New Jersey Application May 4, 1939, Serial No. 271,768

16 Claims. (Cl. 192—18)

The present invention relates to combined clutch and brake mechanism for transmitting power in heavy machinery, such, for instance, as large metal stamping, cutting, and forging presses where it is desirable or necessary to effectively brake or stop the transmission of power to the driven part immediately, or substantially simultaneously, with the declutching of the power disconnection.

An object of the invention resides in the provision of a mechanism of the kind referred to, wherein the clutch or brake will remain locked in clutched or braking position after having been actuated or moved to those positions, without requiring the continued application of the actuating power or force during such clutching or brake operations.

Another object of the invention is the provision of a simple and compact combined clutch and brake mechanism wherein the clutch and the brake each comprise cooperating friction discs, or equivalent elements, arranged in close side by side relation, with an operable member interposed between them to simultaneously apply the clutch and release the brake, or conversely, and means for actuating said operating member to said applied and releasing positions, the operable member holding the clutch or brake so applied irrespective of the actuating means.

A further object of the invention resides in an arrangement as substantially set forth in the preceding paragraph where the actuating means may comprise a fluid pressure actuator operating to apply the clutch and to apply the brake, respectively; and further where the fluid for applying the clutch may be a liquid and the fluid for applying the brake may be air or gaseous.

Some of the advantages flowing from the present invention are that (1) after the clutch or brake is applied they are held locked in applied position whether the pressure from the actuating means is maintained, thereby resulting in great safety; (2) that, after applying the clutch or brake, from the power actuating means may be relieved until the next operation is required, thereby saving considerable power; (3) that by actuating a toggle construction, which applies the clutch and brake respectively, instead of actuating the clutch and brake plates directly, less power is required; and (4) the construction is simple, economical to manufacture and maintain and durable in operation.

Other objects and advantages of this invention will be determined from the following description taken in connection with the accompanying drawings.

In the drawings which show one embodiment of the invention as at present preferred and wherein like characters of reference designate corresponding parts in the various figures:

Fig. 1 is an axial section view through a combined clutch and brake mechanism incorporating features of this invention;

Fig. 1a is a detail view of a locking element for the adjustable wear-ring of the clutch and brake;

Fig. 2 is a transverse partial section taken substantially on line 2—2 of Fig. 1;

Fig. 3 is a transverse cross-section taken substantially on line 3—3 of Fig. 1;

Fig. 4 is a transverse cross-section of a variation in power actuated mechanism for operating the clutch and brake and where a plurality of separate pistons are employed;

Fig. 5 is a longitudinal sectional view showing a further variation in power actuated mechanism adapted for use with liquid pressure on one side and air pressure on its other side; and Fig. 6 is a partial section showing a still further variation in actuating mechanism from that shown in Fig. 1 and wherein the actuating mechanism rotates with the clutch driven parts instead of being stationary as in Fig. 1.

Considering the drawings, the device generally embraces a power drive, a clutch, a brake, a driven member, and means to automatically clutch and release the brake and, conversely, to disengage the clutch and apply the brake to affect the operation of said driven member.

More specifically, referring to Fig. 1, the invention comprises a rotatable driving member 10, driven from a suitable source, mounted for free rotation on shaft 11 by means of suitable roller bearings or other means 12. The member 10 may be a spider or flywheel having a gear or pulley thereon, not shown.

The clutch C comprises an outer clutch ring 13 secured concentrically to one side of the member 10, as by bolts 14, and having attached thereto one or more annular clutch discs 15 each having peripheral lugs 16 slidably received in axial slots or grooves 17 spaced around the inner circumference of the clutch ring. Although these discs 15, by virtue of the lugs 16, rotate with the clutch ring 13, they are free for limited axial movement. The second elements of the clutch comprise an outer relatively non-slidable clamping disc 18 having a laterally extending hub 20, keyed at 19, to the shaft 11 and a relatively movable outer annular clamping disc 23. A series of axial slots 21 are provided at spaced distances in the outer circumference of the laterally extending hub 20 in which are slidably retained lug 21a on the inner circumference of the outer clamping disc 23 and on an intermediate annular clutch disc 22 interposed between the clutch discs 15. The clutch discs 15, 18, 22, and 23 have, of course, concentric and opposed friction surfaces 24 which are movable into and out of engagement to effect a clutching and declutching of the parts. The outer clamping discs 18 and 23 are normally biased to non-clamping or declutching position by one or more compression springs 25 interposed therebetween and extending through openings in the intermediate disc 22 and having their ends retained in recesses in the inner faces of the discs 18 and 23.

The shaft 11 is supported on its ends in one or more bearings 27 carried by the housing or frame 26 and has pinion 28 keyed thereon which in turn meshes with the gears 29 which latter may, for example, drive the crank shaft and cross-head of a power press.

The brake B is similar in all respects to the construction of the clutch just described except one part is held stationary and the other rotates with the shaft or driven member. The clutch C and brake B are arranged side by side and spaced apart sufficiently for the interposition of an operating member 50 which alternately and simultaneously applies one and releases the other.

The brake B is of the disc type and comprises a braking ring 30 secured to a fixed part of the casing or press, preferably the frame 26, by a flange and bolts 31, 32. This brake ring is also provided with axially extending slots 33 in which ride peripheral lugs on the discs 34. A relatively non-slidable outer clamping disc 35 is keyed, at 36, upon the shaft 11 and has an inwardly extending hub 35a thereon having a plurality of axially extending slots 35b therein into which project lugs 35c carried on, respectively, an intermediate movable brake disc 37 and outer movable clamping brake discs 38, similarly as in connection with the clutch C. The brake clamping discs 35 and 38 are normally urged to unclamping position by the spring 25a, similarly as are the clamping discs 18 and 23 of the clutch C. The brake elements and the clutch elements may be interchangeable.

The opposed movable clamping discs 23 and 38 of the clutch C and brake B, respectively, each have an annular axially extending flange 39, facing in opposite directions toward each other and each is provided with an outer threaded surface to threadedly receive a pressure adjusting ring 40 having a wear plate or surface 41. By screwing these rings 40 in or out, the distance between them can be varied with a resultant variation in the pressure which can be applied to the brake or clutch. After adjustment the ring can be locked as in Fig. 1a.

At spaced points about the pressure rings, one or more spring pressed latches or pins 42 lock the rings in place. A recess 43 on the inner face of each pressure adjusting ring 40 receives the pin 42 encircled by a spring 44 which abuts against the ring and a collar 45 on the pin, thereby normally urging the pin axially to engage in apertures 46 drilled in the movable clamping disc 23 or 38 of the clutch or brake to hold the ring 40 in proper adjusted position.

The opposed movable clamping discs 23 of the clutch and 38 of the brake are operated to slide axially of the shaft 11 to alternately and substantially simultaneously engage the clutch and disengage the brake and, conversely, to engage the brake and disengage the clutch by means, preferably, of a single element 50. By "a single element 50" is meant that a single element 50 is between these parts although there may be a plurality of such single elements spaced about the axis of the shaft 11 to obtain an equalized pressure but are otherwise identical in form and operation. The element, or elements, 50 is so designed that, when it has been operated to the extent of its movement, it, of itself, locks the clamping discs 23 or 38 in their effective position and which are not released until the element or elements 50 has been moved to another position, thus eliminating the necessity of requiring the application of the actuating force or power, which actuates the elements 50, for maintaining them in their locked position. The elements 50 are in the form of T-shaped levers which forms part of a toggle mechanism now to be more specifically described.

This toggle mechanism includes a cage or drum 47 keyed, as at 36, to the shaft 11 and has a plurality of pairs of bearing arms 48 (corresponding in number to the elements 50 employed), between each pair of which is disposed a toggle 50 mounted on a pivot pin 51 supported in the arms 48. The toggles 50 are identical and each is somewhat T-shaped in elevation, as shown in Fig. 1, and has the end portions of its two oppositely extending arms c and b in engagement with the wear plates 41 on the pressure adjusting rings 40 on each of the clamping discs 23 and 38 of the clutch and the brake, respectively. The toggle 50 is so designed that, when it is oscillated about its pivot 51 to one of the extreme positions by its arms s, the end portion of one of the arms c and b will be at least in a plane extending through the axis of the pivot 51 perpendicular to the surface of the plates 41, thus axially sliding its respective clamping disc 23 or 38, against the compression of spring 25 or 25a, to effectively apply the clutch C or the brake B and to hold said clamping disc locked in said applied position against the compression of said springs. Of course, it is within the purview of this invention that, when either arm c or b is operated to apply the clutch or brake, its end may be moved beyond the said perpendicular plane or dead center, as an additional safety locking precaution.

When the arm c is in clutch applying position, as shown in Fig. 1, the end of the arm b will have moved arcuately from a corresponding position and the contacting plate 41 on the brake clamping disc 38 will have followed, under the compression of spring 25a, to relieve the clamping pressure of the braking discs, and conversely. The contacting ends of the arms c and b of the toggle 50 may be provided with anti-friction rollers 52c and 52b and the operating stem arm s may have a similar roller 53.

The toggle 50 is actuated to perform the above stated functions by a slidable sleeve 54 disposed within the cage 47 and splined on the shaft 11 for to and fro movement, the sleeve having sockets 54a therein and into which the stem arms s of the togggles 50 extend, respectively, and with whose opposite side walls the rollers 53 contact. Movement may be imparted to the sleeve 54 by any suitable means, but for this purpose power actuated mechanisms are shown in Figs. 1, 3, 4, 5, and 6.

In Figs. 1 and 3, the power mechanism for actuating the toggles 50 comprise an annular cylinder disposed, preferably concentrically, about the shaft 11 and secured to the casing or frame 26 of the device by means of bolts 63 extending through flanges 62. The cylinder contains a double acting piston means connected to an annular coupler 61 surrounding the shaft 11; the coupler 61 being connected by rods or bars 55 to the toggle actuating sleeve 54. More specifically, the cylinder 58 is divided transversely intermediate its ends by partition 59 which forms the cylinder head of expansion chambers $c'$ and $b'$. In each of these expansion chambers there are disposed annular pistons 56 and 57 connected by piston rods 60 (there preferably being two or more as shown in Fig. 3 to give an equalized distribution of pressure) which slidably extend through the cylinder head or partition 59 with a tight leak-proof fit. Suitable packing gland may be supplied. One end of the rods 60 is connected to the coupling 61 so as to impart reciprocable motion to the bars 55 connected with the sleeve 54. Each expansion chamber $c'$ and $b'$ is connected to a source of fluid pressure adjacent their cylinder head 59 by suitable pipes 68 and 67, respectively. These pipes serve both as intake and outlet ports for the cylinders because, when pressure is being supplied to one expansion chamber, the supply pipe or conduit of the other is open to exhaust through the provision of a suitable valve means, not shown, which forms no part of this invention. Such valve means, of course, may provide for a neutral position where both pipes 67 and 68 would be open to exhaust.

The bars 55, connecting the sleeve 54 and the coupling 61 are disclosed longitudinally along the shaft 11 and may be slidably mounted in longitudinal guideways 55a (Fig. 1) cut in or otherwise provided on the shaft 11. These bars 55 slidably extend through openings 69 in the hub 35a of the clamping disc 35 of the brake B and are connected to the sleeve 54 by screws 54a. The cage 47 is cut away in its end walls, as at 49, to give clearance for the operation of the sleeve 54 and to permit the bars 55 to extend thereinto.

Since in Fig. 1, the cylinder 58 will remain stationary and the bars 55 will move with the shaft 11, the coupling 61 comprises a collar $d$ forming part of the ball-bearing retainer and secured by screws $e$ to the outer ends of the bars 55 which it surrounds. Rotatably mounted upon the collar $d$ is a ring $f$ forming the other part of the ball-bearing retainer and to which the ends of the piston rods 60 are connected. The collar $d$ and the ring $f$ embrace and enclose an interposed ball-bearing $g$, which is held in position between spaced abutments or flanges $h$ and $i$ on the collar $d$ and ring $f$ to transmit axial thrust between the collar $d$ and ring $f$, the abutment $i$ on the collar $d$ taking the form of an adjustable nut threaded on one end of the collar which may be locked in position by set screw. Thus, the ring $f$ will not rotate while the collar $e$ rotates with the shaft 11.

In Fig. 4, a modified form of power mechanism is disclosed wherein two or more cylinders 58a are provided equi-spaced about the shaft 11, each of these cylinders having therein double acting pistons 70 carried on piston rods 60'. Aside from providing separate individual cylinders and its pistons, instead of the annual cylinders and pistons concentric with the shaft 11 as shown in Figs. 1 and 3, the construction of the cylinders and pistons are otherwise the same and are supplied with fluid pressure by pipes 67' and 68' in the same manner as described in connection with Figs. 1 and 3. While four cylinders and their pistons have been shown in Fig. 4, it is to be understood that any number, i. e., two or more may be employed provided they are equally spaced about the shaft 11.

Another modified form of actuating mechanism is shown in Fig. 5. This form of actuator is designed particularly to be actuated in one direction by liquid pressure and in the other direction by gaseous or air pressure. Fig. 5 illustrates but one cylinder of a plurality, which are to be arranged as in Fig. 4, and a double acting piston therein. The power actuator of Fig. 5 comprises a cylinder 58b having its opposite end portions, from a point substantially intermediate its ends, of different diameters forming a smaller expansion chamber 71 and a larger expansion chamber 73. The piston of this cylinder comprises a piston head 74 having its opposite ends of such diameter as will be actuated within the respective expansion chambers 71 and 73. The smaller expansion chamber 71 is connected at its outer end to a liquid pressure supply by a pipe 72, while the outer end of the expansion chamber 73 is connected to an air or gaseous pressure supply by pipe 75. The cylinder 58b is so arranged that the piston rod 60'' is connected with the oil actuated head of the piston and with the coupling ring 61. The oil actuated piston head is provided with a series of piston rings 76 about its circumference to prevent the leakage of oil into the air expansion chamber 73, whereas the piston head in the chamber 73 is provided with a piston ring 77 for the type for preventing air leakage from the air expansion chamber 73 into the oil expansion chamber 71. In the use of this type of actuator the oil pressure is utilized to apply the clutch and release the brake, and the air is utilized for applying the brake and releasing the clutch. This arrangement is employed, on the one hand, to apply the clutch as quickly as possible with a pressure which builds up and applies the clutch smoothly to avoid undue wear upon the clutch plates and, on the other hand, to disengage the clutch and apply the brake with greater speed. Air or gaseous pressures act with greater speed than fluid or oil pressures but they have a tendency of building up in a jerky fashion, which is not desirable in connection with the application of the clutch. It is more essential to obtain a quick application of the brake and disengagement of the clutch than it is to obtain a quick application of the clutch and disengagement of the brake.

In Fig. 6 there is shown a fluid pressure actuating mechanism similar to that shown in Fig. 4, but differing, however, in that in Fig. 6 cylinders 56' rotate with the shaft 11 instead of being stationary as in Fig. 1. In this modification the cylinders 58' are keyed, as at 75, to a reduced portion of the shaft 11 and abuts at one end the annular shoulder 79 and at its other end with a boss or bearing 78 at the bearing 27a of the shaft 11. With this arrangement, the fluid pressure is delivered to the expansion chambers of each cylinder through conduits or passages 81 and 82 in the shaft 11. The expansion chambers of the cylinders 58' each have an annular groove 83 and 84, respectively, which communicates, respectively, the passages 81 and 82, and ports 85 and 86, which latter, respectively, open into the expansion chambers of the cylinders 58'.

It is manifest that both the clutch and brake of the present invention are positively actuated to their applied positions thus ensuring definiteness in operation as no springs are relied upon for their operation to such positions; that, when once moved to applied position, either the clutch or brake becomes positively locked in that position until released by the positive actuation of the other to applied position; that one operable member acts upon both the clutch and brake to move them to applied position and to lock them; and that should the power, which actuates to apply the clutch and brake, be relieved or removed, either accidentally or deliberately as a function of the device, the clutch or brake will remain locked in applied position.

Having thus described the invention and the manner in which the same is to be performed, it is to be understood that the invention is not to be limited to the exact form shown and described because it is susceptible to various modifications and changes, and that the invention is only to be limited by the scope of the appended claims.

That which is claimed is:

1. A power transmission device comprising a rotatable clutch and a brake, the clutch being operable to connect the driving and driven members, and the brake being operable to stop the movement of the driven member when the clutch is disengaged, and toggle means between the clutch and brake for positively operating the clutch and the brake alternately to apply one and release the other and to lock the clutch or brake in its applied position until again actuated to apply the other, fluid pressure actuator means disposed about the axis of rotation of the clutch and brake and removed axially from the clutch and brake, and means operatively connecting the actuator to said toggle means.

2. A power transmission device comprising a rotatable clutch and a brake, the clutch being operable to connect the driving and driven members, and the brake being operable to stop the movement of the driven member when the clutch is disengaged, and toggle means for positively operating the clutch and the brake alternately to apply one and release the other and to lock the clutch or brake in its applied position until again actuated to apply the other, power means for actuating said toggle means comprising a plurality of cylinders spaced about the axis of rotation of the clutch, fluid actuated pistons in said cylinders and having an operable connection with said toggle means, and a fluid pressure supply for reciprocating said pistons to move the toggle means to alternate positions.

3. A power transmission device comprising a rotatable clutch and a brake, the clutch being operable to connect the driving and driven members, and the brake being operable to stop the movement of the driven member when the clutch is disengaged, and toggle means for positively operating the clutch and the brake alternately to apply one and release the other and to lock the clutch or brake in its applied position until again actuated to apply the other, power means for actuating said toggle means comprising a plurality of cylinders spaced about the axis of rotation of the clutch, fluid actuated pistons in said cylinders and having an operable connection with said toggle means for alternately actuating the latter upon reciprocation of said pistons, a source of liquid pressure for operating the pistons to apply the clutch and release the brake, and a source of gaseous pressure for operating the pistons in the opposite direction to apply the brake and release the clutch.

4. A power transmission device comprising a driving member, a driven member, a clutch and a brake, the clutch being operatively connected to the driving and driven members, and the brake being operatively connected between the driven member and a relatively stationary part, a toggle member operable to alternate positions to apply the clutch and to release the brake, or conversely, said toggle member being arranged to lock either the clutch or the brake in its position, and means for actuating said toggle member.

5. A power transmission device comprising a driving member, a driven member, a rotatable clutch and a rotatable brake, the clutch being operatively connected to the driving and driven members, and the brake being operatively connected between the driven member and a relatively stationary part, the clutch and brake including opposed movable members for rendering each effective and ineffective, a substantially T-shaped toggle means interposed between the movable brake member and the movable clutch member and operable to alternately move said movable clutch member to applied position and to release the movable brake member from applied position, and conversely; said toggle means being arranged that, when said clutch or brake movable members are in applied positions, it locks the same in said position, and means for actuating said toggle means.

6. A power transmission device comprising a driving member, a driven member, a rotatable clutch and a rotatable brake, the clutch being operatively connected to the driving and driven members, and the brake being operatively connected between the driven member and a relatively stationary part, the clutch and brake including opposed movable members for rendering each effective and ineffective, a substantially T-shaped toggle means interposed between the movable brake member and the movable clutch member and operable to alternately move said movable clutch member to applied position and to release the movable brake member from applied position.

7. A power transmission device as set forth in claim 5, wherein there is a plurality of said toggles spaced around the shaft and interposed between said movable members of said clutch and brake, two arms of each toggle being arranged to operate said movable members of said clutch and brake, respectively, to apply one and release the other and to lock the applied member in applied position, the other of said arms being operatively connected with said actuating means.

8. A power transmission device as set forth in claim 5, wherein there is a plurality of said toggles spaced around a shaft and interposed between said movable members of said clutch and brake, two arms of each toggle being arranged to operate said movable members of said clutch and brake, respectively, to apply one and release the other and to lock the applied member in applied position, a sleeve slidably mounted on the shaft and having an operable connection with the other arm of each of said toggles to alternately shift the latter for operating the movable members of the clutch and brake, said sleeve being connected to said actuating means.

9. A power transmission device comprising a shaft and at least two spaced bearings for the shaft; a clutch on the shaft including a driving member rotatable on the shaft and a member rotatable with the shaft; a brake on the shaft including a relatively stationary part, and a member rotatable with the shaft; both the clutch and brakes also including oppositely arranged elements movable for effecting engagement and disengagement of the clutch and brake, respectively; toggle means interposed between said movable elements of the clutch and brake and shiftable to alternate positions to move either of said movable clutch and brake elements to applied position and to release the other of said elements from applied position; and actuating mechanism for the clutch and brake comprising fluid pressure means disposed concentrically about said shaft and removed axially along the shaft from said clutch and brake, a toggle operating means on the shaft between said movable elements, and means operatively connecting the fluid pressure actuating means and said toggle operating means, said clutch, brake, and fluid pressure actuating means being positioned between said bearings.

10. A power transmission device comprising a shaft, a clutch including a driving member rotatable on the shaft and a member rotatable with the shaft; a brake including a relatively stationary part and a member rotatable with the shaft; both the clutch and brakes also including opposed movable elements for effecting engagement and disengagement of the clutch and brake respectively; a substantially T toggle member interposed between the clutch and said brake and having two of its arms arranged to operate the movable elements of the clutch and brake, respectively, and shiftable to alternate positions to move either of said movable clutch and brake elements to applied position and to release the other from applied position; and means for actuating the other arm of said toggle member.

11. A power transmission device comprising a shaft; a clutch member including a driving member rotatable on the shaft and a member rotatable with the shaft; a brake including a relatively stationary part and a member rotatable with the shaft; both the clutch and brakes also including opposed movable elements for effecting engagement and disengagement of the clutch and brake respectively; a cage surrounding the shaft and interposed between the clutch and brake; substantially T toggle members pivoted on the cage and spaced about the shaft, said toggle members each having two oppositely extending arms engaging said movable elements of the clutch and brake, respectively, and shiftable to alternate positions to move either of said movable clutch and brake elements to applied position and to release the other from applied position, and conversely; and means for actuating the other arm of each of said toggle members to shift the latter.

12. A power transmission device comprising a shaft, a clutch member including a driving member rotatable on the shaft and a member rotatable with the shaft; a brake including a relatively stationary part and a member rotatable with the shaft; both the clutch and brakes also including opposed movable elements for effecting engagement and disengagement of the clutch and brake respectively; a cage surrounding the shaft and interposed between the clutch and brake; substantially T toggle members pivoted on the cage and spaced about the shaft, said toggle members each having two oppositely extending arms engaging said movable elements of the clutch and brake, respectively, and shiftable to alternate positions to move either of said movable clutch and brake elements to applied position and to release the other from applied position, and conversely; a sleeve slidably mounted on the shaft within said cage and having an operable connection with the other arm of each of said toggles, and means for actuating said sleeve.

13. A mechanism as set forth in claim 12 wherein the means for actuating said sleeve comprises fluid pressure actuator disposed about said shaft and having an operable connection with said sleeve.

14. A power transmission device comprising a shaft, a rotatable clutch and a brake mounted thereon, the clutch being operable to connect the driving and driven elements and the brake being operable to stop the movement of the driven member when the clutch is disengaged, a cage member mounted on the shaft between the clutch and brake, means disposed between the clutch and brake and mounted on said cage member for positively operating them alternately to apply one and release the other, an actuator concentrically disposed about the shaft and to one side of said brake, a connection between said clutch and brake operating means and said actuator comprising an element slidable along the shaft and extending into said cage and having operative connection with said operating means.

15. A power transmission device comprising a rotatable clutch and a brake, the clutch being operable to connect the driving and driven members, and the brake being operable to stop the movement of the driven member when the clutch is disengaged, and means for positively operating the clutch and the brake alternately to apply one and release the other and to lock the clutch or brake in its applied position until again actuated to apply the other, fluid pressure actuator means disposed about the axis of rotation of the clutch and brake and removed axially from the clutch and brake, and means operatively connecting the actuator to said means, an element slidable on the shaft and rotatable therewith and having a rotatable connection with said fluid pressure actuator.

16. In a combined fluid pressure operated clutch and brake device, a rotatable clutch and a rotatable brake each comprising a member coaxially rotatable, said members being axially shiftable, actuating means having parts disposed between said members of the clutch and brake to apply the clutch and release the brake and conversely, said actuating means including a plurality of fluid pressure cylinders equi-spaced about the rotatable axis of said clutch and brake and having double-acting pistons therein having an operative connection with said parts, a source of fluid pressure for operating the pistons to apply the clutch and release the brake, a source of gaseous pressure for operating the pistons in opposite directions to apply the brake and release the clutch, and means for conducting fluid pressure to and from said cylinders to actuate said pistons in opposite directions.

LUTHER C. MEYERS.
CONRAD O. HERSAM